United States Patent [19]
Collier

[11] Patent Number: 5,897,617
[45] Date of Patent: Apr. 27, 1999

[54] METHOD AND DEVICE FOR PREPARING AND USING DIPHONES FOR MULTILINGUAL TEXT-TO-SPEECH GENERATING

[75] Inventor: Rene P. G. Collier, Eindhoven, Netherlands

[73] Assignee: U.S. Philips Corporation, New York, N.Y.

[21] Appl. No.: 08/696,431

[22] Filed: Aug. 14, 1996

[30] Foreign Application Priority Data

Aug. 14, 1995 [EP] European Pat. Off. .............. 95202202

[51] Int. Cl.$^6$ ................................ G10L 5/06; G10L 9/00
[52] U.S. Cl. ............................................ 704/260; 704/258
[58] Field of Search ...................................... 704/260, 258

[56] References Cited

U.S. PATENT DOCUMENTS

| | | | |
|---|---|---|---|
| 4,813,074 | 3/1989 | Marcus | 381/36 |
| 5,109,418 | 4/1992 | Van Hemert | 381/43 |
| 5,153,913 | 10/1992 | Collier | 704/258 |
| 5,636,325 | 6/1997 | Farrett | 704/258 |

FOREIGN PATENT DOCUMENTS 952014538  2/1995  European Pat. Off. .

OTHER PUBLICATIONS

"Multi–language intonation synthesis", R. Collier, Journal of Phonetics (1991) 19, 61–73.

*Primary Examiner*—David R. Hudspeth
*Assistant Examiner*—Robert Louis Sax

[57] ABSTRACT

Diphones are prepared for text-to-speech converting by selectively pronouncing a set of selected diphones and processing each such diphone for persistent storage. Finally, each processed diphone is stored in an individually addressable manner. In particular, amongst such set as spoken by a single person, on a basis of homophony each diphone is assigned to one or more diverse languages. Sharing of selective diphones amongst more than one language diminishes required storage. The storage may entail language-specific processing qualifiers.

14 Claims, 2 Drawing Sheets

METHOD AND DEVICE FOR PREPARING AND USING DIPHONES FOR MULTILINGUAL TEXT-TO-SPEECH GENERATING

FIELD OF THE INVENTION

The invention relates to a method for preparing diphones for text-to-speech generating by selectively pronouncing a set of selected diphones, processing each such diphone for persistent storage, and storing each processed diphone in an individually addressable storage location. Diphones have been found to be an excellent vehicle for speech decomposition and representation. For example, U.S. Pat. No. 4,813,074 to Marcus and U.S. Pat. No. 5,109,418 to Van Hemert, both assigned to the present assignee teach extraction of segment boundaries from spoken text. These methods can be used for a diphone from a pair of successive segmented elements of predetermined lenghts before and after the boundary, respectively. A set of such diphones in turn allows for representing speech in a robust manner. In particular, subsequent speech rendering is elementary, because no complex rules are necessary for realising the coarticulation between contiguous phonemes. Once generated, the diphones are stored in conventional storage for later usage. The English language may be well represented by using a 1500 diphone repertory. A need exists for representing multilingual speech. However, required storage at 1500 locations for each language has been found to be extremely burdening, especially in an environment where minimal cost is a prerequisite. Such environments up to now usually have done either without speech rendering, or with only a single language, or with low-quality rendering methods, where storage cost is often irrelevant.

SUMMARY OF THE INVENTION

Accordingly, amongst other things it is an object of the present invention to provide a method according to the preamble that allows to generate a diphone repertory for multilingual speech rendering that alleviates storage capacity requirements. Now, according to one of its aspects, in the invention amongst such set as spoken by a single person on a homophony basis each diphone is assigned to one or more diverse languages for diminishing storage requirements through sharing of selective diphones amongst more than one language. For example, six of the main European languages can be collectively represented by a set of only some 3000 diphones. This is a reduction by a factor of three versus the sixfold enlargement that a sixfold repetition of the 1500 diphones of each particular single language would require. The invention relies on the combined idea, first, that many languages, in particular European languages, have identical or nearly identical combinations of successive sounds, and second, that certain persons have the ability to pronounce such combinations in a way that would be appropriate to several particular languages, even if the person in question were not able to speak the language. Often, such persons are multilingual. In fact, it were only necessary to correctly pronounce a single combination of two sounds to the satisfaction of another person, who is able to speak the 'new' language. The more or less identical pronunciation of a particular diphone in various languages need not be based on correspondence in orthography. On the other hand, identical orthography need not go hand in hand with identical pronunciation.

The above implies that the reusable diphones are always produced by the same voice. On the other hand, it would be fully unacceptable if speech is constructed from a sequence of diphones that are diverse in origin in that they have been generated by multiple persons. The storage proper can be effected in a software-controlled manner: it can be in the form of speech segments that are represented by an appropriate waveform, or rather by parametrized data. The field of application of the invention can be various, such as traffic information systems, public transport enquiry systems, and various others.

Advantageously, certain diphones are stored with processing qualifiers that discriminate processing operations on the diphone in question amongst such various languages sharing that diphone. Such extra processing qualifiers allow to further diminish storage requirements. In this way, also diphones that have particular limited differences can be shared amongst various languages. Such differences may pertain to duration of vowels, aspiration, or vowel quality.

The invention also relates to a method for text-to-speech transforming and to a device therefor. One particular advantage of the invention is the easy manner that exonyms can be inserted into a spoken text. This may, for example, be realized by inserting language identifiers at the start and the termination of the exonym. Further advantageous aspects of the invention are recited in dependent Claims.

BRIEF DESCRIPTION OF THE DRAWINGS

These and other aspects and advantages of the invention will be explained in detail hereinafter with reference to the disclosure of preferred embodiments, and in particular with reference to the appended Figures that show.

DETAILED DESCRIPTION OF PREFERRED EMBODIMENTS

Figure 1:
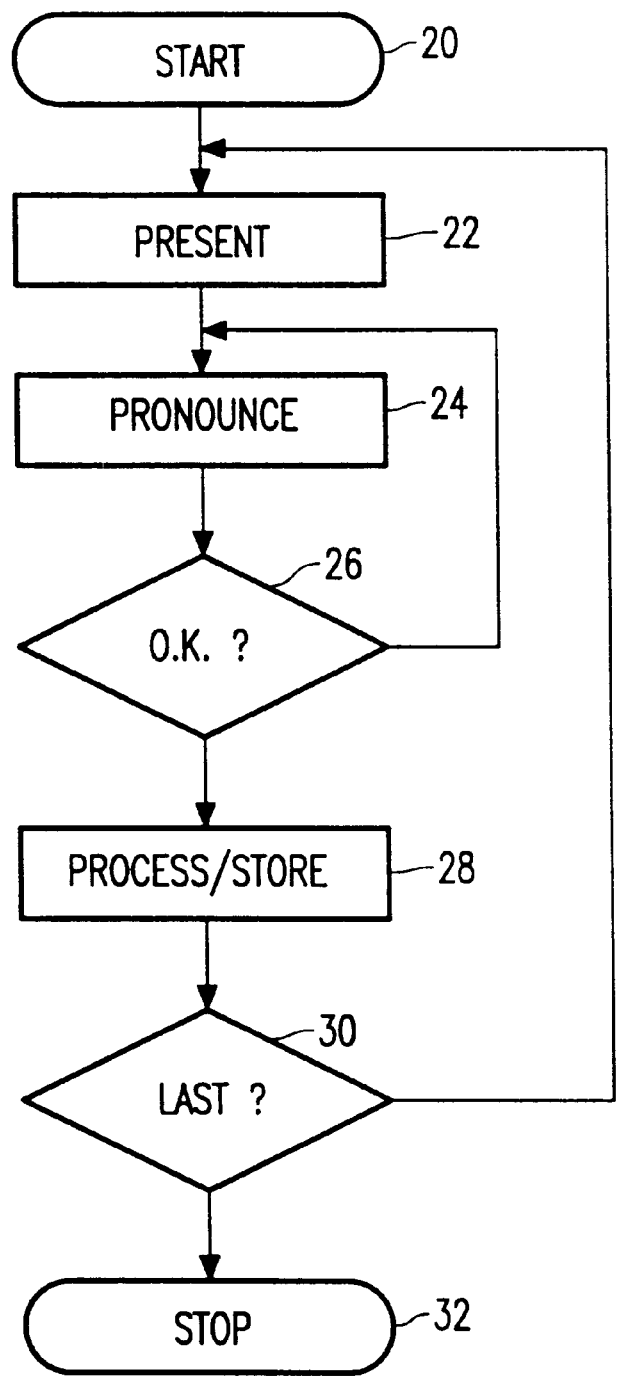
FIG. 1, a flow chat of the diphone preparing.

FIG. 1 shows a flow chart of the diphone preparing. In block 20, the system and user persons prepare for the task. Appropriate storage and processing facilities are allocated, and a list of diphones is set up. In block 22, the first diphone is presented to the single person that is going to pronounce all diphones of the ultimate set. The presentation may be in visual or audio form. In block 24, the first diphone is pronounced by the single person. In block 26, the sound is checked for correct pronunciation. This can be done in a subjective manner by one or more reviewer persons, or alternatively, by some kind of machine comparison with renderings of the same diphone by a standard voice. The pronunciation may be done in an isolated manner, as a sequence of intendedly identical diphones, or in another appropriate way. In case of plural utterances, the 'best' one may be selected by the reviewer. If the pronunciation is considered insufficient, the system goes back to block 24 and requires another pronunciation of the same diphone. The dialog may be supported by visual or audio stimuli, in a manner known for human-machine dialogs in general. For simplicity this is not detailed further.

If the pronunciation is considered sufficient, in block 28 the sound is processed, such as clipped in time domain, standardized in volume, filtered, if necessary transformed into a set of parameters, and stored in a conventional manner. For ultimate usage, this storage must be random-access, but at this particular instant such is not yet necessary. A diphone identifier must be added in that case. In block 30 the system detects whether it is ready. If no, it reverts to block 22 for the next diphone. If yes, in block 32 the activities are closed, such as by outputting the results, to wit now a compact set of diphones that is suitable for outputting of speech in more than one language. Likewise, the output may relate to an enhancing set of diphones for expanding an n-language set to an n+1-language set.

For certain applications, the stored diphones may have processing qualifiers that discriminate processing operations on the diphone in question amongst such various languages sharing this diphone. Examples thereof will be discussed hereinafter.

Figure 2:
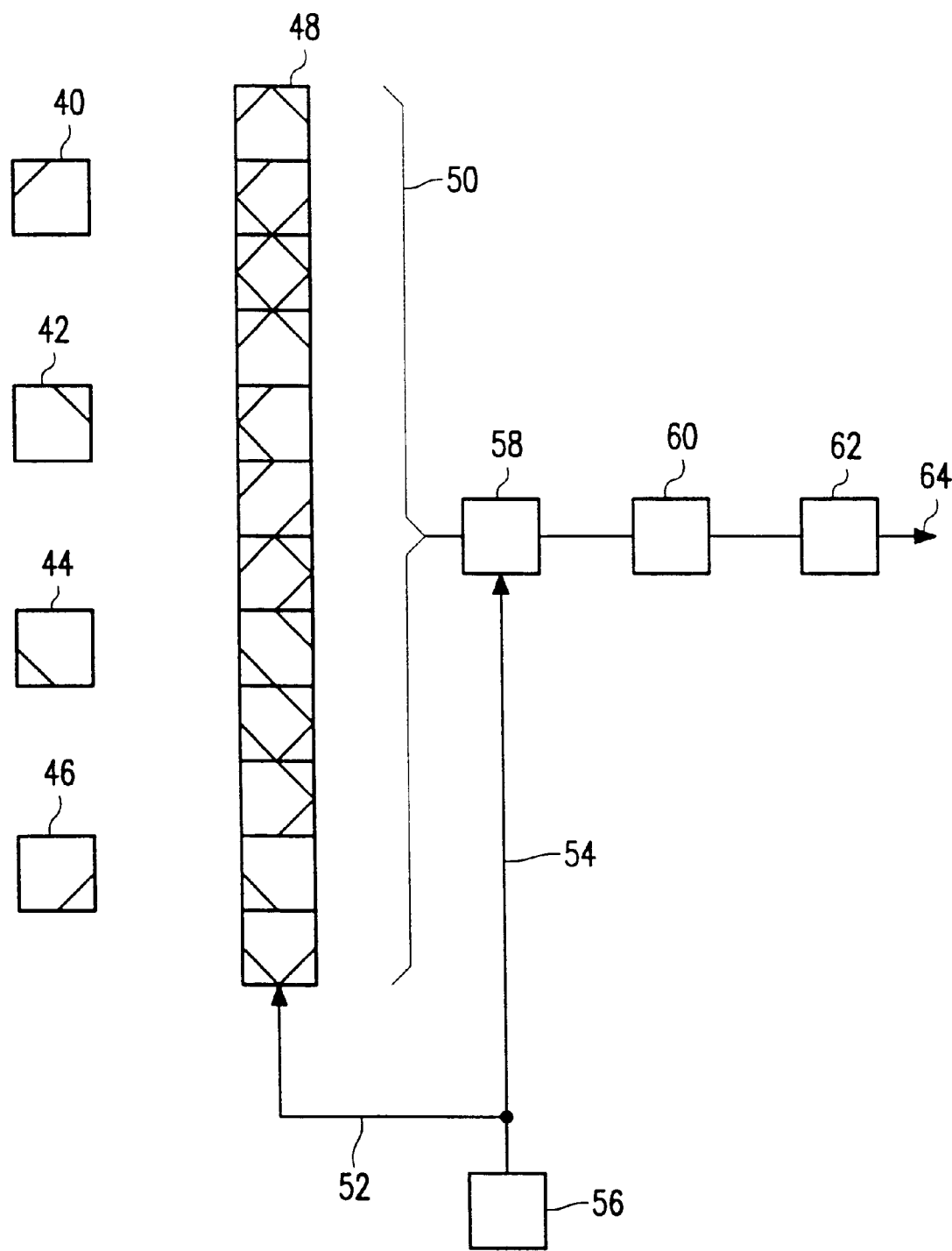
FIG. 2, an apparatus for text-to-speech transformation.

FIG. 2 is a block diagram of an apparatus for text-to-speech transformation. Block 48 represents the storage of the multilingual set, for example realized in semiconductor technology. In the embodiment, the device is used for four different languages, as symbolized by blocks 40–46. Diphone block 40 relates to language A, block 42 relates to language B, block 44 relates to language C, and block 46 relates to language D. In the principal storage, the topmost block therefore relates to languages A and B, the second block to languages A, C, and D, and so on. In the example, only the second last diphone relates only to language C, one diphone relates to all four languages, and the others to various different combinations. The distribution depends on the set of languages, and to a certain extent is open to choice. Generally, the number of different diphones is a matter of choice. In various cases, a particular diphone may be reused among several languages, but the usage of a unique diphone for each language would give a slight improvement. The overall result is a matter of trade-off.

Block 56 represents the input of a string of diphone codes. These may be associated with a duration, aspiration, prosody, or other processing qualifier indication that need not unique for the same diphone, either when in different languages, or in various positions in a sentence. By itself, differentiation of prosody versus the position in a sentence has been disclosed in European Patent Application EP 95201453.8, corresponding U.S. application Ser. No. . . . , . . . (PHN15334) to the same assignee and herein incorporated by reference. The reference however, stores similar speech items for one language in different ways. The present invention goes the other way round by sharing storage among various languages. Likewise, prosody control signals may accompany the diphone string. Line 52 transfers the address code to the storage organization 48. The latter may be location-based or content-addressed, such as alphabetical. Bracket 50 symbolizes the read-out mechanism of the storage proper. Block 58 is the outputting mechanism of the storage, such as amplifier or hold that is controlled by line 54, such as by a synchronizing signal. Block 60 effects the transformation of the diphone for subsequent rendering, such as by windowing in a sequence of diphones, or by translating a parametrized diphone to the 'real' sound. Block 62 is the audio output mechanism, such as a combination of output amplifier and loudspeaker. Item 64 symbolizes the audio output that may be personal or public address. If necessary, speaker verification can be used to verify that all diphones so outputted indeed stem from a single speaker person.

FURTHER CONSIDERATIONS

A reference for rendering speech in a multi-language environment can be found in R. Collier, Multi-language Intonation Synthesis, Journal of Phonetics 19 (1991), 61–73.

Further, the processing of the diphones has two aspects. In the first place, there is the processing on the level of the utterance, that is, the diphones are concatenated and subsequently, speech pitch and rhythm are added. In the second place, there is the processing on the level of the diphone itself, before it is entered into an utterance. The latter kind of processing should lead to further reduction of storage requirements. The following are a few examples:

1. The English word 'mean', the Dutch word 'Mien' (girl's name), and the French word 'mine' (mine, such as for producing coal) share the vowel, the only difference for near-perfect pronunciation being its duration, which is longest in English, shortest in French. The policy therefore is to use the same combination of stored diphones (mi+in), but the storage of the first diphone carries different duration indications for each respective language that may be in the range of 200–80 milliseconds.

2. Even in the same language, a particular diphone may have to be rendered in different ways. For example, the english word 'pin' has aspiration on the sound 'p', which the word 'spin' has not. The same diphone (pi) can be used in other languages, either with, or without aspiration. A particular manner for diminishing storage requirements is to store the diphone as a waveform with aspiration, and to insert marker indications at the start and at the end of the aspiration sound. If required, the aspiration can then be foregone. In both of the above cases, the processing qualifiers apply differentially to the time domain.

3. If the diphones are rather stored as parametric information, the processing can be made differentially in the spectral domain. In the Dutch word 'idee' (idea), the second vocal has more or less the character of a diphthong. In French, the word 'idee' does not have this property. By itself, the lending of the 'diphthong' character can be effected by formant manipulation, known by itself. The Dutch representation of the diphone in question can now be associated with a processing qualifier that controls this manipulation, thereby necessitating the storage of only one diphone. In a similar manner, the diphthong aspect can have different gradations in intensity, such as in the case of 'dose' (English), 'dozen' (Dutch: boxes), and 'dose' (French: dose). It is well known that the number of relevant formants is small, and their frequencies can be stored as a single quantity, or as a slope between two different quantities. In the LPC-based approach, the spectral manipulation can be combined with manipulation in the time domain.

4. However, even without these differentiating processing operations, the approach of the invention remains valid, either with a slightly lower sound quality, or with a somewhat larger storage. The following examples are given, wherein standard phonetic conventions have been used. For simplicity, words have been used that have (nearly) the same text representation in the various languages. However, the same reusability principle applies when the words are phonetically corresponding only in part.

| diphone number | representation | language |
|---|---|---|
| 1 | #s | NL, ENG |
| 2 | sp | NL, ENG |
| 3 | pI | NL, ENG |
| 4 | In | NL, ENG |
| 5 | n# | NL, ENG |

In the above, # indicates silence at the beginning and end, respectively, of the word in question. In both languages, the combination of diphones 1+2+3+4+5 renders the word 'spIn'.

| | | |
|---|---|---|
| 6 | #pʰ | ENG, DE |
| 7 | pʰi | ENG, DE |
| 8 | ik(#) | ENG, DE |

The sequence 6+7+8 renders the word 'pʰik' (peak, Pik) in English and German, respectively.

| | | |
|---|---|---|
| 9 | #i | NL, DE, FR |
| 10 | id | NL, DE, FR |
| 11 | de(#) | NL, DE, FR |
| 12 | de¹(#) | NL |

The sequence 9+10+11 renders the word 'ide' (German 'Idee', French 'idée'), the sequence 9+10+12 renders the word 'ideⁱ'(Dutch 'idee', with a slight diphthong aspect).

| | | |
|---|---|---|
| 13 | #f | NL, DE, FR |
| 14 | fa | NL, DE, FR |
| 15 | at | NL, DE, FR |
| 16 | ta | NL, DE, FR |
| 17 | al | NL, FR, DE* |
| 18 | 1# | NL, FR, DE* |

The sequence 13+14+15+16+17+18 render the basis of the Dutch word 'fataal' (fatal), German 'fatal' or French 'fatal'. For each language the both vocals get their respective lengths adjusted. If required, the last two diphones are stored another time for German only (signalled by an asterisk *) with a somewhat 'thinner' pronunciation of the "l", because it is difficult to achieve this with differentiated processing for this language.

I claim:

1. A method for creating a diphone database useful for generating speech from text, the method including the steps of:
   pronouncing a set of selected diphones;
   processing each of the selected diphones for storage;
   assigning each of the selected diphones to one or more of a plurality of different languages, at least a subset of the set of selected diphones being assigned to at least two of the different languages;
   storing each of the selected diphones in a memory device; and,
   for each language, storing processing qualifiers for the diphones assigned to that language in the memory device in such a manner that when the diphones assigned to that language are accessed for the purpose of synthesizing speech in that language, the processing qualifiers specific to that language can be selectively extracted.

2. The method as set forth in claim 1, wherein the step of pronouncing is carried out by employing a single person to homophonically pronounce each of the selected diphones.

3. The method as set forth in claim 1, wherein the step of storing is carried out by storing each of the selected diphones in a separate, individually addressable storage location in the memory device.

4. The method as set forth in claim 1, wherein the processing qualifiers include diphone duration indicia.

5. The method as set forth in claim 1, wherein the processing qualifiers include intonation indicia.

6. The method as set forth in claim 1, wherein the processing qualifiers include aspiration indicia.

7. The method as set forth in claim 1, wherein the processing qualifiers include formant intensity and frequency indicia.

8. The method as set forth in claim 1, wherein the processing qualifiers include markers indicating the start and end of an aspiration sound.

9. The method as set forth in claim 1, wherein the processing qualifiers include pitch and rhythm indicia.

10. An apparatus for synthesizing speech in any selected one of a plurality of different languages from text, the apparatus including a diphone database created in accordance with the method set forth in claim 1.

11. The apparatus as set forth in claim 10, wherein the apparatus includes:
    a processing section that receives the text in a form of diphone identifier strings and extracts the diphones identified by the diphone identifiers from the memory device, and that extracts the processing qualifiers from the memory device specific to the selected one of the plurality of different languages that is chosen by a user; and,
    transforming the text into speech in the selected one of the plurality of different languages using the diphones and processing qualifiers extracted by the processing section.

12. The apparatus as set forth in claim 10, wherein the apparatus includes:
    processing means for receiving the text in a form of diphone identifier strings and extracting the diphones identified by the diphone identifiers from the memory device, and extracting the processing qualifiers from the memory device specific to the selected one of the plurality of different languages that is chosen by a user; and,
    transforming means for transforming the text into speech in the selected one of the plurality of different languages using the diphones and processing qualifiers extracted by the processing means.

13. A method for synthesizing speech in any selected one of a plurality of different languages from text by employing a diphone database created in accordance with the method of claim 1.

14. The method as set forth in claim 13, wherein the method includes the steps of:
    receiving the text in a form of diphone identifier strings and extracting the diphones identified by the diphone identifiers from the memory device;
    extracting the processing qualifiers from the memory device specific to the selected one of the plurality of different languages that is chosen by a user; and,
    transforming the text into speech in the selected one of the plurality of different languages using the diphones and processing qualifiers extracted by the processing means.

* * * * *